(12) United States Patent
Takeda

(10) Patent No.: US 7,742,278 B2
(45) Date of Patent: Jun. 22, 2010

(54) DIELECTRIC CERAMIC COMPOSITION AND LAMINATED CERAMIC CAPACITOR

(75) Inventor: Toshikazu Takeda, Omihachiman (JP)

(73) Assignee: Murata Manufacturing Co., Ltd., Nagaokakyo,-shi, Kyoto-fu (JP)

( * ) Notice: Subject to any disclaimer, the term of this patent is extended or adjusted under 35 U.S.C. 154(b) by 0 days.

(21) Appl. No.: 12/635,218

(22) Filed: Dec. 10, 2009

(65) Prior Publication Data

US 2010/0085681 A1    Apr. 8, 2010

Related U.S. Application Data

(63) Continuation of application No. PCT/JP2008/057720, filed on Apr. 22, 2008.

(30) Foreign Application Priority Data

Jun. 20, 2007    (JP)    ............... 2007-162801

(51) Int. Cl.
*H01G 4/06*    (2006.01)

(52) U.S. Cl. ............ 361/321.2; 361/311; 361/306.1; 361/313; 361/321.1; 361/301.4; 501/134; 501/135

(58) Field of Classification Search ........ 361/301.4, 361/311–313, 321.1, 321.2, 321.4, 321.5, 361/306.1, 306.3; 501/134–135; 252/62.9
See application file for complete search history.

(56) References Cited

U.S. PATENT DOCUMENTS

| 5,037,784 | A |   | 8/1991 | Raveau et al. |   |
|---|---|---|---|---|---|
| 5,122,923 | A | * | 6/1992 | Matsubara et al. | ....... 361/321.5 |
| 5,519,234 | A | * | 5/1996 | Paz de Araujo et al. | ..... 257/295 |
| 6,093,339 | A | * | 7/2000 | Kimura et al. | .......... 252/62.9 R |
| 6,248,678 | B1 | * | 6/2001 | Pinckney | ..................... 501/10 |
| 7,393,803 | B2 | * | 7/2008 | Takeda et al. | ............... 501/135 |
| 2005/0006618 | A1 | * | 1/2005 | Nanao et al. | ............ 252/62.9 R |
| 2007/0152183 | A1 | * | 7/2007 | Furukawa et al. | ....... 252/62.9 R |

FOREIGN PATENT DOCUMENTS

WO    WO-2006/114914 A1    11/2006

OTHER PUBLICATIONS

PCT Written Opinion.

* cited by examiner

*Primary Examiner*—Nguyen T Ha
(74) *Attorney, Agent, or Firm*—Dickstein, Shapiro, LLP.

(57) ABSTRACT

There is provided a dielectric ceramic composition that is a dielectric ceramic material used for a laminated ceramic capacitor; that can be co-fired with internal electrodes mainly composed of Ni at a temperature of 1300° C. or less; and that has a high dielectric constant, good temperature characteristics of capacitance in a range of −55 to 175° C., and a high resistivity ρ at 175° C. The dielectric ceramic composition includes a main component represented by a composition formula (1-a) $(K_{1-x}Na_x)(Sr_{1-y-z}Ba_yCa_z)_2Nb_5O_{15}$-a$(Ba_{1-b}Ca_b)TiO_3$ (where a, b, x, y, and z are all molar amounts and $0.3 \leq a \leq 0.8$, $0 \leq b \leq 0.2$, $0 \leq x < 0.2$, $0.1 \leq y \leq 0.5$, $0.1 \leq z \leq 0.5$, and $0.2 \leq y+z \leq 0.7$); and M, as an additional component, in an amount of 0.1 to 40 parts by mole relative to 100 parts by mole of the main component (where M is at least one element from the group of V, Mn, Cr, Fe, Co, Ni, Zn, Mg, and Si).

18 Claims, 1 Drawing Sheet

DIELECTRIC CERAMIC COMPOSITION AND LAMINATED CERAMIC CAPACITOR

This is a continuation of application Serial No. PCT/JP2008/057720, filed Apr. 22, 2008, the contents of which is incorporated herein by reference.

TECHNICAL FIELD

The present invention relates to a dielectric ceramic composition and a laminated ceramic capacitor, and particularly to a dielectric ceramic composition whose elemental composition is a mixed crystal system of $KSr_2Nb_5O_{15}$ compounds having a tungsten bronze structure and $BaTiO_3$ compounds having a perovskite structure and a laminated ceramic capacitor that uses the dielectric ceramic composition.

BACKGROUND ART

A laminated ceramic capacitor that is a principal application of the present invention is typically manufactured as follows.

First, there is prepared a ceramic green sheet that contains a dielectric ceramic raw material and on which a conductive material which will become internal electrodes is provided in a desired pattern.

Subsequently, a plurality of ceramic green sheets including the above-mentioned ceramic green sheet to which a conductive material has been provided are stacked and heat-bonded to manufacture an integrated green laminated body.

The green laminated body is then fired to obtain a sintered laminated body. Internal electrodes composed of the above-mentioned conductive material are thus formed inside the laminated body.

Subsequently, an external electrode is formed on the outer surface of the laminated body so as to be electrically connected to particular internal electrodes. For example, the external electrode is formed by providing conductive paste containing conductive metal powder and glass frit to the outer surface of the laminated body and then baking the conductive paste. Thus, a laminated ceramic capacitor is completed.

To reduce manufacturing cost of the laminated ceramic capacitor, inexpensive Ni is desirably used as the material of the internal electrodes. When Ni is used as a material of the internal electrodes, the atmosphere during the firing of the laminated body needs to be a reducing atmosphere to prevent the oxidation of Ni during the firing because Ni is a base metal.

To fire the laminated body in a reducing atmosphere, the dielectric ceramic material needs to have reduction resistance. International Publication No. WO2006/114914 Pamphlet (hereinafter referred to as Patent Document 1) discloses a $KSr_2Nb_5O_{15}$ ceramic composition as a material having reduction resistance and good electrical properties.

Patent Document 1—International Publication No. WO2006/114914

DISCLOSURE OF INVENTION

The $KSr_2Nb_5O_{15}$ ceramic composition disclosed in Patent Document 1 exhibits a good dielectric constant when used in a laminated ceramic capacitor having internal electrodes mainly composed of Ni.

However, the $KSr_2Nb_5O_{15}$ ceramic composition disclosed in Patent Document 1 poses a problem in that while the composition had a high dielectric constant, it has an insufficient temperature characteristics of capacitance. In particular, temperature stability at a high temperature of about 175° C. has been required in recent years. Furthermore, the capacitance change due to temperature relative to the capacitance at 25° C. (the temperature characteristics of capacitance) needs to be ±15% or less in a temperature range of −55 to 175° C. This guarantees the stability at a higher temperature than the temperature range (−55 to 150° C.) of the X8R characteristic of the EIA standard.

The resistivity $\rho$ of insulation resistance at 175° C. needs to be high in order to exhibit the temperature stability at high temperature, but this was also insufficient.

In view of the foregoing problems, one of the objects of the present invention is to provide a dielectric ceramic composition that achieves a high dielectric constant, stable temperature characteristics of capacitance, and a high resistivity $\rho$ even at a high temperature of about 175° C., and to provide a laminated ceramic capacitor that uses the dielectric ceramic composition.

A dielectric ceramic composition of the present invention includes a dielectric ceramic composition, as a main component, represented by a composition formula $(1-a)(K_{1-x}Na_x)(Sr_{1-y-z}Ba_yCa_z)_2Nb_5O_{15}\text{-}a(Ba_{1-b}Ca_b)TiO_3$ (where a, b, x, y, and z are all molar amounts and $0.3 \leq a \leq 0.8$, $0 \leq b \leq 0.2$, $0 \leq x < 0.2$, $0.1 \leq y \leq 0.5$, $0.1 \leq z \leq 0.5$, and $0.2 \leq y+z \leq 0.7$ are satisfied); and M, as an additional component, in an amount of 0.1 to 40 parts by mole relative to 100 parts by mole of the main component (where M is at least one element selected from a group consisting of V, Mn, Cr, Fe, Co, Ni, Zn, Mg, and Si).

A laminated ceramic capacitor of the present invention includes a plurality of stacked dielectric ceramic layers; a plurality of internal electrodes disposed between the plurality of dielectric ceramic layers; and a pair of external electrodes electrically connected to different internal electrodes, wherein the dielectric ceramic layers are formed of the dielectric ceramic composition described above.

In the laminated ceramic capacitor of the present invention, the internal electrodes preferably contain Ni as a main component.

Advantages

The dielectric ceramic composition of the present invention can provide a high dielectric constant, good temperature characteristics of capacitance in a range of −55 to 175° C., and a sufficiently high resistivity $\rho$ at 175° C. Accordingly, a laminated ceramic capacitor having stable characteristics even in a high-temperature environment can be obtained.

REFERENCE NUMERALS

Figure 1:
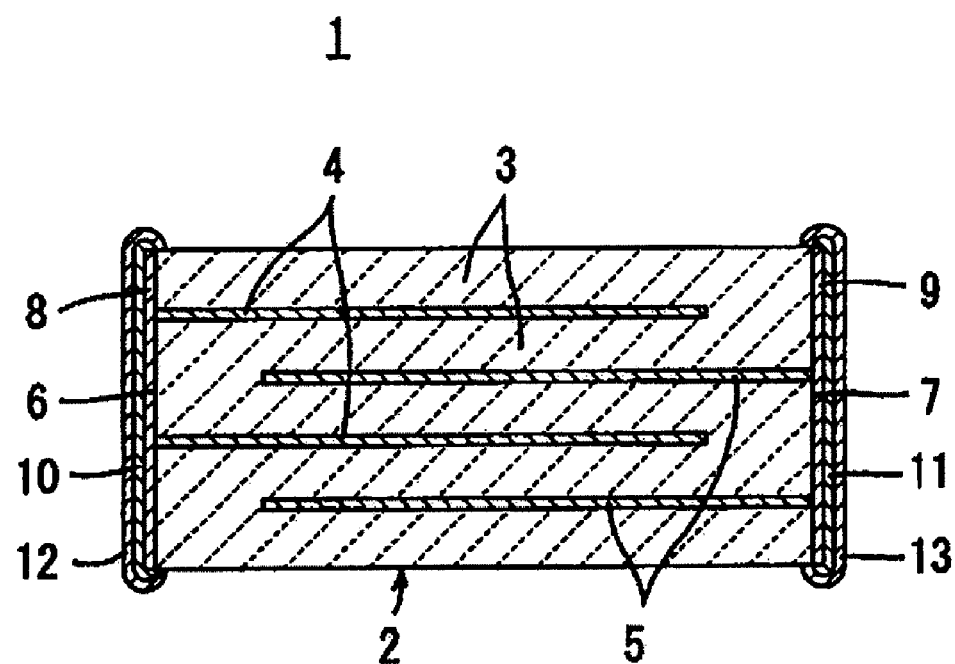
FIG. 1 is a sectional view schematically showing a laminated ceramic capacitor according to an embodiment of the present invention.

1 laminated ceramic capacitor
2 ceramic laminated body
3 dielectric ceramic layer
4,5 internal electrodes
8,9 external electrodes

BEST MODE FOR CARRYING OUT THE INVENTION

A laminated ceramic capacitor to which a dielectric ceramic of the present invention is mainly applicable will be described. FIG. 1 is a sectional view showing a typical laminated ceramic capacitor 1.

The laminated ceramic capacitor 1 includes a rectangular parallelepiped ceramic laminated body 2. The ceramic laminated body 2 includes a plurality of stacked dielectric ceramic layers 3 and a plurality of internal electrodes 4 and 5 formed along the interfaces between pairs of dielectric ceramic layers 3. The internal electrodes 4 and 5 are formed so as to extend to the outer surfaces of the ceramic laminated body 2. Inside the ceramic laminated body 2, the internal electrodes 4 that extend to one end face 6 of the ceramic laminated body 2 and the internal electrodes 5 that extend to the other end face 7 are alternately disposed through the dielectric ceramic layers 3 so as to form capacitance.

In consideration of cost reduction, the conductive material of the internal electrodes 4 and 5 is preferably nickel or a nickel alloy.

To extract the above-mentioned capacitance, external electrodes 8 and 9 are formed on the outer surfaces of the ceramic laminated body 2, that is, on the end faces 6 and 7 so as to be electrically connected to the internal electrodes 4 and the internal electrodes 5, respectively. The same conductive material as that of the internal electrodes 4 and 5 can be used as a conductive material of the external electrodes 8 and 9. In addition, silver, palladium, a silver-palladium alloy, or the like can be used. The external electrodes 8 and 9 are formed by providing conductive paste obtained through the addition of glass frit to the powder of the above-described metal or alloy and then by baking the conductive paste.

First plating layers 10 and 11 composed of nickel, copper, or the like are optionally formed on the external electrodes 8 and 9, respectively. Furthermore, second plating layers 12 and 13 composed of solder, tin, or the like are formed on the first plating layers 10 and 11, respectively.

A dielectric ceramic composition of the present invention will now be described in detail.

The dielectric ceramic composition of the present invention is mainly composed of a mixed crystal system of $KSr_2Nb_5O_{15}$ compounds having a tungsten bronze structure and $BaTiO_3$ compounds having a perovskite structure.

One of the mixed crystals, $(K_{1-x}Na_x)(Sr_{1-y-z}Ba_yCa_z)_2Nb_5O_{15}$, has a tungsten bronze crystal structure. The molar ratio of the K, Sr, Nb, and O sites is basically 1:2:5:15. However, the molar ratio may fluctuate to some extent as long as the tungsten bronze structure is maintained. When, assuming that the composition formula is $(KSr_2)_mNb_5O_{15}$, m is more than 1.16 or less than 0.96, the sinterability is degraded, which is not preferable.

K may be replaced with Na, but the replacement molar amount x needs to be less than 0.2. When x is 0.2 or more, the dielectric constant is decreased.

Sr may be replaced with Ba and Ca. The replacement molar amounts y and z satisfy the three formulas $0.1 \leq y \leq 0.5$, $0.1 \leq z \leq 0.5$, and $0.2 \leq y+z \leq 0.7$. When y and/or z are excessively small, the resistivity ρ is decreased. When y and/or z are excessively large, the sinterability is degraded.

The other of the mixed crystals, $(Ba_{1-b}Ca_b)TiO_3$, has a perovskite crystal structure. The molar ratio of the Ba, Ti, and O sites is basically 1:1:3. However, the molar ratio may fluctuate to some extent as long as the perovskite structure is maintained and defects such as abnormal grain growth and abnormal precipitation do not appear.

Ba may be replaced with Ca, but the replacement molar amount b is 0.2 or less. When b is more than 0.2, a heterophase component is increased, which is not preferable.

When the $(K_{1-x}Na_x)(Sr_{1-y-z}Ba_yCa_z)_2Nb_5O_{15}$ and $(Ba_{1-b}Ca_b)TiO_3$ constitute a mixed crystal system at a molar ratio of (1-a) :a and $0.3 \leq a \leq 0.8$, the capacitance change due to temperature is within ±15% in a temperature range of −55 to 175° C. and $\log(\rho/\Omega m)$ of the resistivity ρ at 175° C. is 8.0 or more, while a high dielectric constant is maintained. When a is outside the above-mentioned range, the temperature characteristics of capacitance are degraded and the resistivity ρ is decreased.

Furthermore, by containing, as an additional component, 0.1 to 40 parts by mole of M relative to 100 parts by mole of the main component (where M is at least one element selected from a group consisting of V, Mn, Cr, Fe, Co, Ni, Zn, Mg, and Si), sufficient sinterability is achieved even at a temperature of 1300° C. or less. If M is not contained, sufficient sinterability is not achieved even at 1400° C. When more than 40 parts by mole of M are added, sufficient insulation is not achieved.

A publicly known method may be adopted as a method for manufacturing the dielectric ceramic composition of the present invention. For example, the dielectric ceramic composition of the present invention can be obtained by a solid-phase method in which starting materials such as oxide powder and carboxide are mixed and the resultant mixed powder is then heat-treated.

Examples of the starting materials of tungsten bronze compounds include $K_2CO_3$, $SrCO_3$, and $Nb_2O_5$. Examples of the starting materials of perovskite compounds include $BaCO_3$ and $TiO_2$. These starting materials may be all mixed first and then calcined to produce a mixed crystal system composed of (1-a) $(K_{1-x}Na_x)(Sr_{1-y-z}Ba_yCa_z)_2Nb_5O_{15}$-a$(Ba_{1-b}Ca_b)TiO_3$. Alternatively, after the powder of a tungsten bronze compound and the powder of a perovskite compound are separately prepared, the two powders may be mixed and then fired to produce a mixed crystal system composed of (1-a) $(K_{1-x}Na_x)(Sr_{1-y-z}Ba_yCa_z)_2Nb_5O_{15}$-a$(Ba_{1-b}Ca_b)TiO_3$.

The additional component M may be mixed at the same time when the starting materials of the main component are mixed or may be mixed by being added to the prepared powder of the main component.

EXAMPLE

Example of the dielectric ceramic composition of the present invention and the laminated ceramic capacitor that uses the dielectric ceramic composition will now be described.

In this Example, the effect on electrical properties was investigated by changing the content of elements constituting the main component and the kind and content of elements constituting the additional component. Sample numbers 1 to 27 were assigned to the prepared samples. Table 1 shows the composition of the samples. Table 2 shows the firing temperature of the samples and the measurement results of electrical properties. The details will be described hereinafter.

First, $K_2CO_3$, $Na_2CO_3$, $SrCO_3$, $CaCO_3$, $BaCO_3$, $Nb_2O_5$, and $TiO_2$ were prepared as starting materials of the main component. In view of the composition formula (1-a) $(K_{1-x}Na_x)(Sr_{1-y-z}Ba_yCa_z)_2Nb_5O_{15}$-a$(Ba_{1-b}Ca_b)TiO_3$, the starting materials were weighed such that a, b, x, y, and z described in each of the sample numbers in Table 1 are satisfied. In addition, $V_2O_3$, $MnCO_3$, $Cr_2O_3$, $CoCO_3$, $Fe_2O_3$, NiO, ZnO, $MgCO_3$, and $SiO_2$ were prepared as starting materials of the additional component, and then weighed such that the total value of M (part by mole relative to 100 parts by mole of the main component) described in each of the sample numbers in Table 1 is satisfied.

The weighed powder was mixed in a solvent using a ball mill. After drying, the resultant mixture was heat-treated at 1100° C. for 2 hours to obtain ceramic raw material powders having sample numbers 1 to 27.

TABLE 1

| Sample No. | a | b | x | y | z | M (part by mole) Total | V | Mn | Cr | Fe | Co | Ni | Zn | Mg | Si |
|---|---|---|---|---|---|---|---|---|---|---|---|---|---|---|---|
| 1 | 0.75 | 0.05 | 0.10 | 0.20 | 0.20 | 0.00 | 0 | 0 | 0 | 0 | 0 | 0 | 0 | 0 | 0 |
| 2 | 0.85 | 0.15 | 0.00 | 0.30 | 0.20 | 0.15 | 0.05 | 0.05 | 0 | 0 | 0 | 0.05 | 0 | 0 | 0 |
| 3 | 0.80 | 0.00 | 0.00 | 0.10 | 0.10 | 0.40 | 0.2 | 0.2 | 0 | 0 | 0 | 0 | 0 | 0 | 0 |
| 4 | 0.70 | 0.00 | 0.05 | 0.10 | 0.10 | 0.20 | 0.1 | 0.1 | 0 | 0 | 0 | 0 | 0 | 0 | 0 |
| 5 | 0.60 | 0.05 | 0.00 | 0.15 | 0.20 | 0.40 | 0.2 | 0.2 | 0 | 0 | 0 | 0 | 0 | 0 | 0 |
| 6 | 0.50 | 0.10 | 0.10 | 0.30 | 0.20 | 0.20 | 0.1 | 0.1 | 0 | 0 | 0 | 0 | 0 | 0 | 0 |
| 7 | 0.40 | 0.15 | 0.15 | 0.35 | 0.35 | 2.0 | 1 | 1 | 0 | 0 | 0 | 0 | 0 | 0 | 0 |
| 8 | 0.30 | 0.20 | 0.00 | 0.30 | 0.40 | 10.0 | 5 | 5 | 0 | 0 | 0 | 0 | 0 | 0 | 0 |
| 9 | 0.50 | 0.00 | 0.10 | 0.20 | 0.20 | 13.0 | 5 | 5 | 0 | 0 | 0 | 0 | 0 | 1 | 2 |
| 10 | 0.50 | 0.00 | 0.10 | 0.35 | 0.30 | 17.0 | 1 | 2 | 0.5 | 0 | 0.5 | 10 | 1 | 2 | 0 |
| 11 | 0.50 | 0.10 | 0.18 | 0.40 | 0.30 | 12.5 | 2 | 5 | 1 | 1 | 0 | 0 | 0.5 | 0 | 3 |
| 12 | 0.60 | 0.05 | 0.02 | 0.10 | 0.15 | 0.40 | 0.1 | 0.1 | 0 | 0 | 0 | 0.1 | 0 | 0 | 0.1 |
| 13 | 0.60 | 0.05 | 0.03 | 0.15 | 0.10 | 4.0 | 1 | 1 | 0 | 0 | 1 | 0 | 1 | 0 | 0 |
| 14 | 0.60 | 0.10 | 0.10 | 0.10 | 0.10 | 15.0 | 5 | 5 | 5 | 0 | 0 | 0 | 0 | 0 | 0 |
| 15 | 0.60 | 0.10 | 0.15 | 0.10 | 0.10 | 40.0 | 10 | 10 | 0 | 10 | 0 | 0 | 0 | 0 | 10 |
| 16 | 0.50 | 0.05 | 0.10 | 0.10 | 0.15 | 12.0 | 3 | 0 | 0 | 5 | 0 | 0 | 0 | 3 | 1 |
| 17 | 0.50 | 0.15 | 0.05 | 0.15 | 0.10 | 13.0 | 2 | 1 | 5 | 0 | 0 | 5 | 0 | 0 | 0 |
| 18 | 0.50 | 0.20 | 0.03 | 0.10 | 0.15 | 0.40 | 0.1 | 0.1 | 0 | 0 | 0 | 0.1 | 0 | 0 | 0.1 |
| 19 | 0.50 | 0.15 | 0.02 | 0.15 | 0.10 | 3.0 | 0 | 1 | 0 | 0 | 1 | 0 | 1 | 0 | 0 |
| 20 | 0.40 | 0.10 | 0.10 | 0.10 | 0.10 | 10.0 | 0 | 5 | 5 | 0 | 0 | 0 | 0 | 0 | 0 |
| 21 | 0.40 | 0.05 | 0.10 | 0.10 | 0.10 | 30.0 | 0 | 10 | 0 | 10 | 0 | 0 | 0 | 0 | 10 |
| 22 | 0.35 | 0.00 | 0.05 | 0.10 | 0.10 | 6.5 | 5 | 0 | 0 | 0 | 0 | 0 | 0 | 1 | 0.5 |
| 23 | 0.70 | 0.05 | 0.30 | 0.30 | 0.30 | 2.0 | 1 | 1 | 0 | 0 | 0 | 0 | 0 | 0 | 0 |
| 24 | 0.50 | 0.10 | 0.05 | 0.60 | 0.10 | 12.4 | 10 | 1 | 0 | 0.2 | 0 | 0.2 | 0 | 0 | 1 |
| 25 | 0.50 | 0.05 | 0.05 | 0.10 | 0.60 | 11.9 | 0 | 5 | 2 | 0 | 1 | 3 | 0.2 | 0.2 | 0.5 |
| 26 | 0.50 | 0.05 | 0.00 | 0.20 | 0.10 | 41.9 | 0.4 | 0.3 | 10 | 15 | 5 | 0.2 | 5 | 5 | 1 |
| 27 | 0.25 | 0.00 | 0.00 | 0.20 | 0.10 | 7.8 | 1 | 2 | 0.2 | 0.1 | 2 | 0 | 0 | 1.5 | 1 |

Subsequently, after a polyvinyl butyral binder and ethanol were added to each of the ceramic raw material powders having sample numbers 1 to 27, each of the ceramic raw material powders was wet-mixed using a ball mill to prepare ceramic slurry. The ceramic slurry was formed into a sheet by the doctor blade method to obtain a rectangular ceramic green sheet having a thickness of 8 μm. A conductive paste mainly composed of Ni was printed on the ceramic green sheet of each of the samples to form a conductive paste film used for an internal electrode.

In each of the samples, a plurality of the green sheets were stacked such that the edges to which the conductive paste film extends so as to be exposed to the outside were alternately arranged as shown in FIG. 1, to obtain a green laminated body. The green laminated body was heated to 350° C. in a $N_2$ gas atmosphere to decompose and burn out the binder. Subsequently, the green laminated body was fired at the temperature shown in Table 2 for 2 hours in a reducing atmosphere composed of a $H_2$—$N_2$—$H_2O$ gas at an oxygen partial pressure of $10^{-9}$ to $10^{-12}$ MPa to obtain a ceramic laminated body. After that, a Ag paste containing $B_2O_3$—$SiO_2$—BaO glass frit was applied to both end faces of the laminated body of each of the samples. The laminated body was baked at 800° C. in a $N_2$ gas atmosphere to form external electrodes electrically connected to the internal electrodes.

Thus, the samples of laminated ceramic capacitors having sample numbers 1 to 27 were obtained. The laminated ceramic capacitors had a width of 3.2 mm, a length of 4.5 mm, and a thickness of 0.5 mm as outer dimensions. The thickness of the dielectric ceramic layers that lie between the internal electrodes was 6 μm. The number of effective dielectric ceramic layers was five and the area per layer of the electrodes facing each other was $2.5 \times 10^{-6}$ m².

For each of the samples described above, capacitance and dielectric loss were measured using an automatic bridge measuring apparatus at 25° C., 1 kHz, and 1 Vrms. A dielectric constant was calculated from the obtained capacitance. Table 2 shows the results.

Subsequently, the capacitance change due to temperature (%) relative to the capacitance at 25° C. was measured by changing temperature from −55 to 175° C. The capacitance change due to temperature (%) at −55 and 175° C. is shown in Table 2 as the measurement results.

For each of the samples, insulation resistance R was measured using an insulation resistance tester by applying a direct-current voltage of 30 V at 175° C. for 1 minute. A resistivity ρ was calculated from the obtained insulation resistance R. Table 2 shows a value of $\log(\rho/\Omega m)$ of the calculated ρ.

TABLE 2

| Sample No. | Firing temperature (° C.) | Dielectric constant | Dielectric loss (%) | Resistivity at 175° C. $\log(\rho/\Omega m)$ | Capacitance change due to temperature (%) −55° C. | 175° C. |
|---|---|---|---|---|---|---|
| 1 | 1400 | 1000 | 30 | 5.6 | −14.3 | −5.4 |
| 2 | 1250 | 3000 | 6.0 | 7.8 | −18.3 | −5.1 |
| 3 | 1225 | 3500 | 7.0 | 8.6 | −7.5 | −14.2 |
| 4 | 1250 | 3400 | 6.8 | 8.4 | −8.2 | −12.1 |

TABLE 2-continued

| Sample No. | Firing temperature (° C.) | Dielectric constant | Dielectric loss (%) | Resistivity at 175° C. log(ρ/Ωm) | Capacitance change due to temperature (%) | |
|---|---|---|---|---|---|---|
| | | | | | −55° C. | 175° C. |
| 5 | 1225 | 3200 | 6.4 | 8.8 | −9.6 | 1.1 |
| 6 | 1250 | 2700 | 5.4 | 8.5 | −11.1 | 5.1 |
| 7 | 1200 | 2100 | 4.2 | 9.0 | −12.1 | 13.5 |
| 8 | 1175 | 2000 | 4.0 | 9.1 | −14.8 | 14.5 |
| 9 | 1175 | 2900 | 5.8 | 9.0 | −10.5 | 1.1 |
| 10 | 1150 | 2500 | 5.0 | 9.2 | −10.3 | 6.1 |
| 11 | 1175 | 2100 | 4.2 | 9.3 | −9.8 | 13.9 |
| 12 | 1250 | 2300 | 4.6 | 8.6 | −9.3 | −10.8 |
| 13 | 1200 | 2350 | 4.7 | 8.9 | −9.5 | −11.2 |
| 14 | 1175 | 2400 | 4.8 | 9.1 | −8.3 | −9.5 |
| 15 | 1150 | 2500 | 5.0 | 9.4 | −8.1 | −10.4 |
| 16 | 1175 | 2300 | 4.6 | 9.2 | −10.3 | −2 |
| 17 | 1175 | 2300 | 4.6 | 9.4 | −9.9 | −3.5 |
| 18 | 1250 | 2200 | 4.4 | 8.6 | −9.7 | −4 |
| 19 | 1225 | 2300 | 4.6 | 9.0 | −9.8 | −3.1 |
| 20 | 1175 | 2300 | 4.6 | 9.5 | −11.4 | −7.1 |
| 21 | 1150 | 2500 | 5.0 | 9.6 | −11.9 | −6.2 |
| 22 | 1200 | 2300 | 4.6 | 9.1 | −13.9 | −4.7 |
| 23 | 1200 | 700 | 1.4 | 8.8 | −7.5 | 12.3 |
| 24 | not sintered | — | — | — | — | — |
| 25 | not sintered | — | — | — | — | — |
| 26 | 1250 | 1900 | 26 | 5.2 | −10.0 | 5.0 |
| 27 | 1200 | 2000 | 3.9 | 7.8 | −17.8 | 13.2 |

Table 2 shows that in the samples within the scope of the present invention among the sample Nos. 1 to 27, the internal electrodes mainly composed of Ni and dielectric ceramic layers could be simultaneously fired at a temperature of 1300° C. or less in a reducing atmosphere; the dielectric constant was 2000 or more; the capacitance change due to temperature was within ±15% in a range of −55 to 175° C.; and log(ρ/Ωm) of the resistivity ρ at 175° C. was 8.0 or more.

In contrast, since the additional component M was not contained in the sample No. 1, sufficient insulation was not achieved even if the sample was fired at 1400° C. Consequently, the dielectric constant was as low as about 1000.

In the sample Nos. 2 and 27, the capacitance change due to temperature was outside the range of ±15% and log(ρ/Ωm) was less than 8.0 because the ratio a of perovskite compound to the tungsten bronze component was outside the range of 0.3 to 0.8.

In the sample No. 23, the dielectric constant was as low as 700 because the amount x at which K is replaced with Na in a tungsten bronze compound was 0.2 or more.

In the sample Nos. 24 and 25, the sinterability was poor because the amount y at which Sr is replaced with Ba or the amount z at which Sr is replaced with Ca in a tungsten bronze compound was excessively high.

In the sample No. 26, the insulation was degraded and the dielectric loss was increased because the content of the additional component M exceeds 40 parts by mole relative to 100 parts by mole of the main component.

It should be considered that the embodiments and Examples disclosed in this entire specification are mere examples and do not limit the present invention. The scope of the present invention is specified by Claims but not by the above-mentioned embodiments and Examples, and any revision and modification can be made within the scope and spirit of Claims.

INDUSTRIAL APPLICABILITY

A dielectric ceramic composition of the present invention has a high dielectric constant, good temperature characteristics of capacitance in a range of −55 to 175° C., and a sufficiently high resistivity ρ at 175° C. Accordingly, the dielectric ceramic composition can be employed as a material of dielectric ceramic layers of a laminated ceramic capacitor used in a high-temperature environment.

The invention claimed is:

1. A dielectric ceramic composition comprising as a main component, a composition represented by the general formula (1-a) $(K_{1-x}Na_x)(Sr_{1-y-z}Ba_yCa_z)_2Nb_5O_{15}$-a$(Ba_{1-b}Ca_b)TiO_3$ in which the $(K_{1-x}Na_x)(Sr_{1-y-z}Ba_yCa_z)_2Nb_5O_{15}$ has a tungsten bronze structure and the $(Ba_{1-b}Ca_b)TiO_3$ has a perovskite structure, a, b, x, y, and z are all molar amounts and $0.3 \leq a \leq 0.8$, $0 \leq b \leq 0.2$, $0 \leq x < 0.2$, $0.1 \leq y \leq 0.5$, $0.1 \leq z \leq 0.5$, and $0.2 \leq y+z \leq 0.7$; and M, as an additional component, in an amount of 0.1 to 40 parts by mole relative to 100 parts by mole of the main component where M is at least one element selected from the group consisting of V, Mn, Cr, Fe, Co, Ni, Zn, Mg, and Si.

2. The dielectric ceramic composition according to claim 1, wherein $0.35 \leq a \leq 0.7$, $0.05 \leq b \leq 0.15$, $x<0.18$, $y \leq 0.35$, and $z \leq 0.35$.

3. A laminated ceramic capacitor comprising a plurality of stacked dielectric ceramic layers; a plurality of internal electrodes each of which is disposed between an adjacent pair of dielectric ceramic layers; and a pair of external electrode each of which is electrically connected to a different one of the plurality of internal electrodes, wherein the dielectric ceramic layers are a fired dielectric ceramic composition according to claim 2.

4. The laminated ceramic capacitor according to claim 3, wherein the internal electrodes comprise Ni.

5. The dielectric ceramic composition according to claim 2, wherein the amount of M is 0.2 to 30 parts by mole relative to 100 parts by mole of the main component.

6. A laminated ceramic capacitor comprising a plurality of stacked dielectric ceramic layers; a plurality of internal electrodes each of which is disposed between an adjacent pair of dielectric ceramic layers; and a pair of external electrode each of which is electrically connected to a different one of the plurality of internal electrodes, wherein the dielectric ceramic layers are a fired dielectric ceramic composition according to claim 5.

7. The laminated ceramic capacitor according to claim 6, wherein the internal electrodes comprise Ni.

8. The dielectric ceramic composition according to claim 5, wherein M comprises at least one of V and Mn.

9. A laminated ceramic capacitor comprising a plurality of stacked dielectric ceramic layers; a plurality of internal electrodes each of which is disposed between an adjacent pair of dielectric ceramic layers; and a pair of external electrode each of which is electrically connected to a different one of the plurality of internal electrodes, wherein the dielectric ceramic layers are a fired dielectric ceramic composition according to claim 8.

10. The laminated ceramic capacitor according to claim 9, wherein the internal electrodes comprise Ni.

11. The dielectric ceramic composition according to claim 1, wherein the amount of M is 0.2 to 30 parts by mole relative to 100 parts by mole of the main component.

12. The dielectric ceramic composition according to claim 11, wherein M comprises at least one of V and Mn.

13. A laminated ceramic capacitor comprising a plurality of stacked dielectric ceramic layers; a plurality of internal electrodes each of which is disposed between an adjacent pair of dielectric ceramic layers; and a pair of external electrode each of which is electrically connected to a different one of the plurality of internal electrodes, wherein the dielectric ceramic layers are a fired dielectric ceramic composition according to claim 12.

14. The laminated ceramic capacitor according to claim 13, wherein the internal electrodes comprise Ni.

15. A laminated ceramic capacitor comprising a plurality of stacked dielectric ceramic layers; a plurality of internal electrodes each of which is disposed between an adjacent pair of dielectric ceramic layers; and a pair of external electrode each of which is electrically connected to a different one of the plurality of internal electrodes, wherein the dielectric ceramic layers are a fired dielectric ceramic composition according to claim 11.

16. The laminated ceramic capacitor according to claim 15, wherein the internal electrodes comprise Ni.

17. A laminated ceramic capacitor comprising a plurality of stacked dielectric ceramic layers; a plurality of internal electrodes each of which is disposed between an adjacent pair of dielectric ceramic layers; and a pair of external electrode each of which is electrically connected to a different one of the plurality of internal electrodes, wherein the dielectric ceramic layers are a fired dielectric ceramic composition according to claim 1.

18. The laminated ceramic capacitor according to claim 17, wherein the internal electrodes comprise Ni.

\* \* \* \* \*